United States Patent

[11] 3,584,153

[72] Inventor Dan J. Kinzer
Orem, Utah
[21] Appl. No. 822,969
[22] Filed May 8, 1969
[45] Patented June 8, 1971

[54] AUTOMATIC REPLACEMENT OF A FAULTY AMPLIFIER
10 Claims, 1 Drawing Fig.

[52] U.S. Cl. .......... 179/1
[51] Int. Cl. .......... H03f 21/00
[50] Field of Search .......... 179/1 (A), 1 (B), 1 (SW), 1 (R), 1 (MN)

[56] References Cited
UNITED STATES PATENTS
3,051,788 8/1962 Seeley .......... 179/1

*Primary Examiner*—Kathleen H. Claffy
*Assistant Examiner*—Douglas W. Olms
*Attorney*—Rea C. Helm

ABSTRACT: An automatic amplifier changer with latching relays connects the microphone and loudspeaker from an amplifier that has failed to a spare amplifier. An audio tone is connected to the spare amplifier microphone input. If the spare amplifier loudspeaker output does not reach a predetermined level the spare amplifier automatically is turned off and the microphone and loudspeaker are disconnected from the spare amplifier.

PATENTED JUN 8 1971 3,584,153
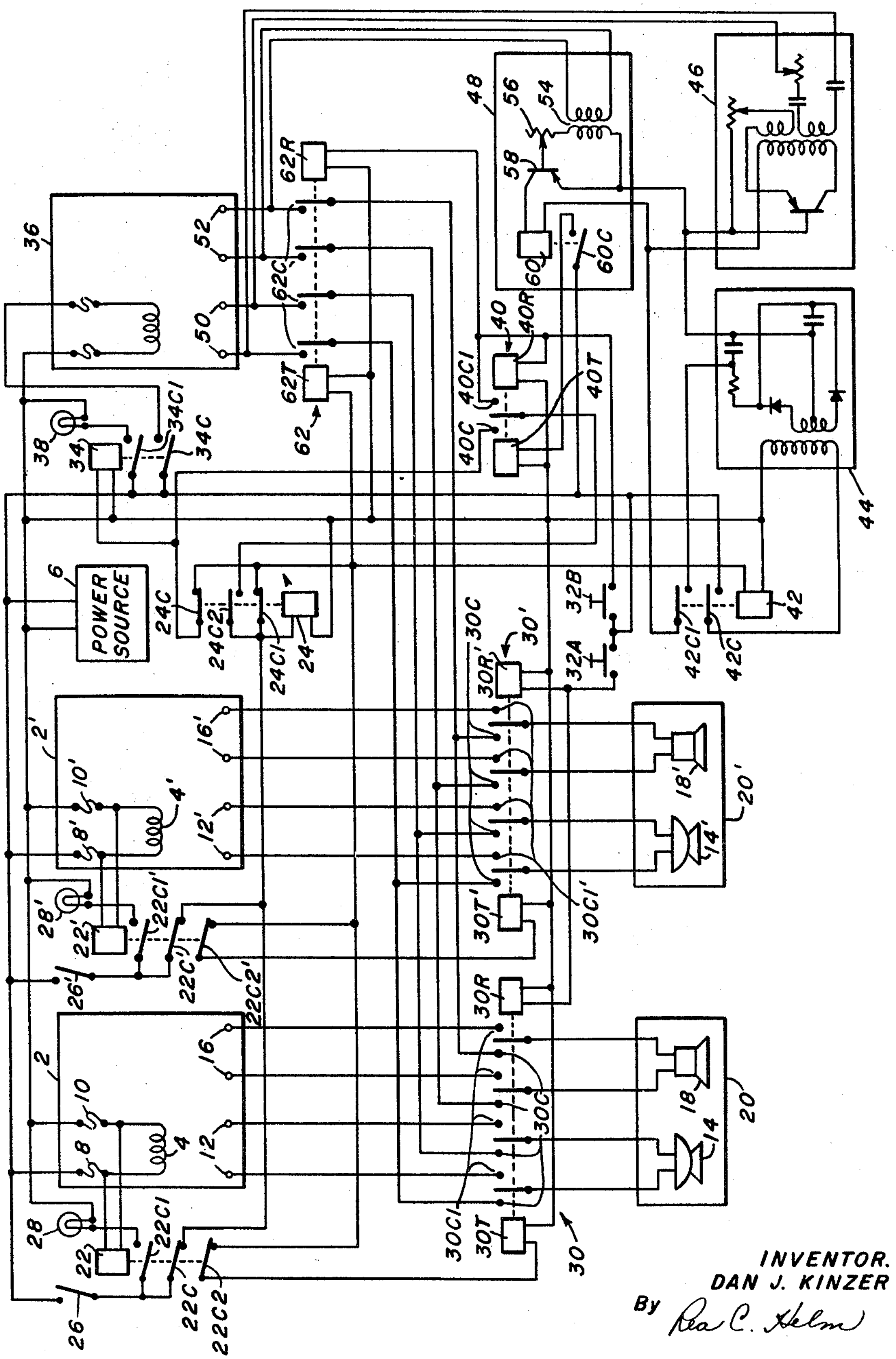
INVENTOR.
DAN J. KINZER
By
Attorney

AUTOMATIC REPLACEMENT OF A FAULTY AMPLIFIER

This invention relates to an automatic electric switching device and more particularly to apparatus for connecting a spare amplifier in place of an amplifier that has failed in a public address system.

In multiple public address systems where it is desirable to have the amplifiers in a central location, a system for automatically replacing an amplifier that has failed is necessary to maintain communications. Since amplifier failure may be caused by shorted or grounded microphone and loudspeaker lines as well as internal faults, it is important to know if these lines are in satisfactory operating condition when a spare amplifier is connected into a system, particularly if the lines are long.

According to my invention, when an amplifier power fuse fails, the amplifier is disconnected from the microphone and loudspeaker lines. A spare amplifier is immediately energized and connected to the lines. At the same time, a test signal is sent through the microphone and loudspeaker lines and amplifier. If the test signal is attenuated because of shorted or grounded lines, the spare amplifier is disconnected.

It is, therefore, an object of my invention to provide a public address system amplifier changer that automatically disconnects an amplifier from the microphone and loudspeaker lines when the amplifier fails and connects a spare amplifier to microphone and loudspeaker lines.

Another object is to provide such a changer that tests the to the microphone and loudspeaker when the spare amplifier is connected.

Still another object is to provide such a changer to disconnect the spare amplifier if the lines to the microphone and loudspeaker are faulty.

These and other objects will become more apparent after referring to the following specification and drawing, in which:

The single FIGURE is a schematic diagram of my invention.

Referring now to the drawing, reference numeral 2 refers to a public address system amplifier which has a power transformer primary winding 4 connected to a 115-volt, 60-cycle power source 6 through fuses 8 and 10. Amplifier 2 has input terminals 12 connected to a microphone 14 and output terminals 16 connected to a loudspeaker 18. Microphone 14 and loudspeaker 18 are spaced apart in a general service area 20 which is remote from the location of amplifier 2. A second public address system amplifier 2′ is the same type as amplifier 2 and has winding 4′, fuses 8′ and 10′, input terminals 12′ and output terminals 16′ connected to microphone 14′ and loudspeaker 18′ at a second remote service area 20′ in the same manner as the first public address system. This is a conventional multiple station public address system using a heavy-duty industrial-type amplifier such as a FEMCO audio amplifier, 150-watt, Model AM3304.

A tripping relay coil 22 having normally closed contacts 22C and 22C2 and normally open contact 22C1 is connected across winding 4. A time delay relay coil 24 having normally closed contacts 24C and 24C1 and a normally open contact 24C2 is connected to power source 6 through a switch 26 and contact 22C. Relay 24 actuates its armature about 100 seconds after coil 24 is energized. An indicating lamp 28 is connected to power source 6 through contact 22C1 and switch 26. A transfer (latching) relay 30 having closed trip contacts 30C and closed reset contacts 30C1 has a reset coil 30R connected to source 6 through a reset push button 32A and a trip coil 30T connected to source 6 through contacts 22C2, 24C1, and 22C and switch 26. Contacts 30C1 connect microphone 14 and speaker 18 to input 12 and output 16, respectively.

Connected in a similar manner are lamp 28′, tripping relay coil 22′ with contacts 22C′, 22C1′ and 22C2′, switch 26′ and transfer (latching) relay 30′ with trip coil 30T′, trip contacts 30C′, reset coil 30R′ and reset contacts 30C1′, all associated with amplifier 2′.

A power relay coil 34 having normally open contacts 34C and 34C1 is connected to source 6 through contacts 24C, 24C1, 22C and switch 26. A spare amplifier 36 is connected to source 6 through contact 34C and an indicating lamp 38 is connected to source 6 through contact 34C1. A proving (latching) relay 40 has a closed trip contact 40C and a closed reset contact 40C1. Coil 34 is also connected to contact 22C through contacts 24C2 and 40C.

An oscillator relay coil 42 having normally open contacts 42C and 42C1 is connected to source 6 through contacts 24C1 and 22C and switch 26. A 12-volt direct current power source 44 is connected to source 6 through contact 42C. The output of power source 44, shown with only essential components, is connected through contact 42C1 to an audio tone oscillator 46 and a transistorized relay 48 both shown with only essential components. The output of oscillator 46 is connected to input terminals 50 of amplifier 36. Output terminals 52 of amplifier 36 are connected through a stepdown transformer 54 into potentiometer 56 in relay 48 to the base and emitter of a transistor 58. A test relay 60 having a normally open contact 60C is connected to power source 44 through contact 42C1 and the collector-emitter of transistor 58.

A trip coil 40T of relay 40 is connected to source 6 through contact 60C. A reset coil 40R is connected to source 6 through a reset push button 32B. A spare transfer (latching) relay 62 has closed trip contacts 62C, a trip coil 62T connected to source 6 through contacts 24C1, 22C and switch 26, and a reset coil 62R connected to source 6 through pushbutton 32B in parallel with contacts 40C1, 24C2, 22C, and switch 26. Contacts 30C connect microphone 14 and loudspeaker 18 to input terminals 50 and output terminals 52, respectively, through contacts 62C.

To operate the amplifier changer, power source 6 is energized and switches 26 and 26′ are closed to energize relay coils 22 and 22′ and thus turn on lamps 28 and 28′. Reset pushbutton 32 is momentarily closed to energize the reset coils 30R, 30R′, 40R and 62R. This connects amplifiers 2 and 2′ to stations 20 and 20′, respectively, and disconnects the input and output lines from amplifier 36 to the contacts of relays 30 and 30′.

Assume that amplifier 2 has been overloaded sufficiently to blow fuse 8 and/or fuse 10. This could result from an internal fault in the amplifier such as a tube failure or a capacitor failure, or an external fault such as a shorted or grounded speaker line. This deenergizes coil 22 and lamp 2 goes off to indicate that amplifier 2 is no longer in service. Contact 22C also closes, which energizes time delay relay coil 24. However, since relay 24 is timed to delay actuating the armature by about 100 seconds, contacts 24C and 24C1 remain closed so that power relay 34 is energized, thus closing its contacts 34 and 34C1. This energizes spare amplifier 36 and turns on lamp 38. Transfer relays 30 and 62 are tripped through contacts 22C and 24C1. This disconnects microphone 14 and speaker 18 from amplifier 2 and connects them to amplifier 36 through contacts 30C and 62C. At the same time, oscillator relay 42 is energized which then energizes power source 44 through contact 42C. Power source 44 through contact 42C1 energizes oscillator 46 which sends an audio signal into the microphone input lines 50 of amplifier 36.

When spare amplifier 36 is heated to operating temperature, about 30 seconds after relay 22 is deenergized, and if the lines connecting amplifier 36 to speaker 18 and microphone 14 are not grounded or shorted, the audio tone will be amplified in amplifier 36 and the output of terminals 52 will be of sufficient magnitude through stepdown transformer 54 to trigger transistor 58 on. The trigger level is adjusted by potentiometer 56. This energizes test relay coil 60, closing contact 60C and tripping proving relay 40, closing contacts 40C.

The time delay relay 24 then times out, the time delay of 100 seconds being sufficient to bring amplifier 36 to operating temperature and test the lines. At this time, contacts 24C1 and 24C open, deenergizing oscillator relay 42. This deenergizes power supply 44 and oscillator 46. Power relay 34 remains energized through proving relay coil contacts 40C. Thus, the lines have been tested and the spare amplifier connected, and the operator is alerted to the failure of amplifier 2 and the connection of spare amplifier 36 by the condition of lamps 28 and 38.

If the lines connecting amplifier 36 to speaker 18 and microphone 14 are either grounded or shorted when the audio tone from oscillator 46 is connected to input terminal 50, the output from terminal 52 will not be of sufficient magnitude to trigger transistor 58. Thus relay contacts 60C will not close so that contact 40C will remain open and when timing relay 24 times out, power relay 34 will be deenergized, turning off amplifier 36 and lamp 38. Since proving relay contacts 40C1 are still closed, spare transfer relay reset coil 62R is energized which disconnects amplifier 36 from the contacts 30C. The operator is alerted to the failure of amplifier 2 and the determination of faulty lines to area 20 is indicated by the condition of lamps 28 and 38.

The heavy-duty industrial-type amplifiers in this system can withstand heavy load for a considerable period. Shorting or grounding of microphone lines will not necessarily result in a blown amplifier fuse but will result in insufficient spare amplifier output to actuate test relay 60.

The amplifier changer operates in the same manner when there is a failure of fuse 8′, 10′, or both. The amplifier changer may be used with any number of systems.

While one embodiment of my invention has been shown and described, it is obvious that other modifications and adaptations may be made.

I claim:

1. Apparatus for automatically changing amplifiers in a public address system comprising a microphone; a loudspeaker, a first amplifier connected to the microphone and loudspeaker; a second amplifier; an audio frequency signal source connected to the microphone input of the second amplifier; a power source; means for connecting the power source to energize the first amplifier; means responsive to the first amplifier supply current exceeding a predetermined level for disconnecting the microphone and loudspeaker from the first amplifier, for connecting the microphone and loudspeaker to the second amplifier, and for connecting the power source for a predetermined interval to the second amplifier and the signal source; and means connected to the loudspeaker output of the second amplifier and responsive to the amplification of the signal by the second amplifier at the end of the predetermined interval for retaining connection of the power source to the second amplifier when the amplification is above a predetermined level.

2. Apparatus according to claim 1 in which the means responsive to the amplification of the signal by the second amplifier includes means for disconnecting the microphone and loudspeaker from the second amplifier when the amplification is below the predetermined level.

3. Apparatus according to claim 2 in which the means for disconnecting the microphone and the loudspeaker from the first amplifier and for connecting the microphone and the loudspeaker to the second amplifier includes means for disconnecting the first amplifier from the power source when the supply current exceeds a predetermined level, a tripping relay coil connected to the power source through the means for disconnecting the first amplifier and having first and second normally closed contacts, a time delay relay coil connected to the power source through the first normally closed tripping relay contact and having a first normally closed contact, a first latching relay trip coil connected to the first normally closed tripping relay contact through the first normally closed time delay relay contact and the second normally closed tripping relay contact and having trip contacts connecting the microphone and the loudspeaker to the first amplifier and reset contacts connected to the microphone and loudspeaker, and a second latching relay trip coil connected to the first normally closed time delay relay contact and having trip contacts connecting the first latching relay reset contacts to the second amplifier.

Apparatus according to claim 3 in which the signal source includes a direct current power supply and an oscillator connected to the direct current power supply.

5. Apparatus according to claim 4 in which the means for connecting the power source for a predetermined interval to the second amplifier and the signal source includes a second normally closed time delay relay contact connected to the first normally closed time delay relay contact, a power relay coil connected to the second normally closed time delay relay contact and having a normally open contact connecting the power source to the second amplifier, and an oscillator relay coil connected to the first normally closed time delay relay contact and having a first normally open contact connecting the power source to the direct current power supply and a second normally closed contact connecting the direct current power supply output to the oscillator.

6. Apparatus according to claim 5 in which the predetermined interval is established by a time delay between the energization of the time delay relay coil and the actuation of the time delay relay armature.

7. Apparatus according to claim 6 in which the means responsive to the signal amplification above a predetermined level includes a test relay having a normally open contact, a transistor having its base and emitter connected to the loudspeaker output of the second amplifier, and its collector and emitter connected in series with the direct current power supply and the test relay coil, a normally open time delay relay contact, and a third latching relay trip coil connected to the power source through the normally open test relay contact and having a trip contact connecting the power relay coil to the first normally closed tripping relay contact through the normally open time delay relay contact.

8. Apparatus according to claim 7 in which the means responsive to the signal amplification below a predetermined level includes a second latching relay reset coil for opening the second latching relay trip contacts when the coil is energized, and a third latching relay reset contact connecting the second latching relay reset coil to the normally open time delay relay contact.

9. Apparatus according to claim 8 including means connecting the power source to the reset coils of the latching relays.

10. Apparatus according to claim 9 which includes at least one additional amplifier connected to the power source with a microphone and a loudspeaker associated with each amplifier; a tripping relay associated with each amplifier and connected to the power source and the time delay relay; a latching relay associated with each amplifier connecting each microphone and loudspeaker to the associated amplifier and the second latching relay and connected to the associated tripping relay; and means connecting the power source to the reset coils of the latching relays.

UNITED STATES PATENT OFFICE

CERTIFICATE OF CORRECTION

Patent No. 3,584,153 Dated June 8, 1971

Inventor(s) Dan J. Kinzer

It is certified that error appears in the above-identified patent and that said Letters Patent are hereby corrected as shown below:

Column 1, line 30, after "the" insert -- lines --.
Column 2, line 46, "2" should read -- 28 --.
Column 4, line 12, before "Apparatus" insert -- 4. --.

Signed and sealed this 11th day of April 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334